United States Patent
Brahme et al.

(10) Patent No.: US 6,841,784 B2
(45) Date of Patent: Jan. 11, 2005

(54) RADIATION SENSOR DEVICE

(75) Inventors: Anders Brahme, Danderyd (SE); Christian Iacobaeus, Varmdo (SE); Janina Östling, Stockholm (SE); Roger Kihlberg, Varnamo (SE)

(73) Assignee: Ray Therapy Imaging AB, Uppsala (SE)

( * ) Notice: Subject to any disclaimer, the term of this patent is extended or adjusted under 35 U.S.C. 154(b) by 268 days.

(21) Appl. No.: 10/186,626

(22) Filed: Jul. 2, 2002

(65) Prior Publication Data

US 2004/0004189 A1 Jan. 8, 2004

(51) Int. Cl.$^7$ .............................................. G01T 1/185
(52) U.S. Cl. .............................. 250/370.08; 250/370.09
(58) Field of Search ...................... 250/370.08, 370.09, 250/370.1, 370.11, 370.12, 370.13, 363.04, 363.06, 363.07, 363.1, 339.02

(56) References Cited

U.S. PATENT DOCUMENTS

| 4,161,655 A | 7/1979 | Cotic et al. |
| 4,831,639 A | 5/1989 | Harke |
| 4,845,731 A | 7/1989 | Vidmar et al. |
| 6,403,964 B1 | 6/2002 | Kyyhkynen |
| 2004/0042705 A1 * | 3/2004 | Uchida et al. ............... 385/14 |

FOREIGN PATENT DOCUMENTS

| EP | 0 421 869 A1 | 4/1991 |
| WO | 01/59478 A1 | 8/2001 |

* cited by examiner

Primary Examiner—Constantine Hannaher
Assistant Examiner—Otilia Gabor
(74) Attorney, Agent, or Firm—Young & Thompson

(57) ABSTRACT

A radiation sensor device (20) for detection of radiation. A sensor device with an array of radiation sensitive elements (24) forming a sensor surface (26) is provided. The device comprises a number of circuit boards (21), each with a row of radiation sensitive elements, such as X-ray sensitive charge collectors, provided at the edge portion. The radiation sensitive elements are each connected to signal processing means (28), e.g. ASICs with amplifiers, outside the radiation field by a respective connection line (25) arranged on a main surface (22) of the circuit board. A number of circuit boards are arranged adjacent to each other with the main planes substantially perpendicular to the sensor surface. By using the circuit card depth the invention easily provides surfaces with a very large number of individually connected radiation sensitive elements, resulting in improved image resolution.

38 Claims, 7 Drawing Sheets

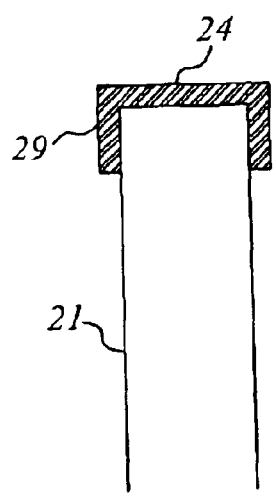
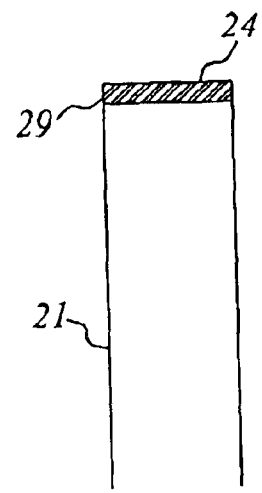
*FIG. 5*        *FIG. 6*
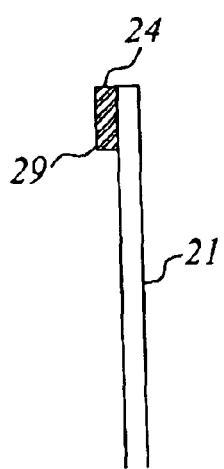
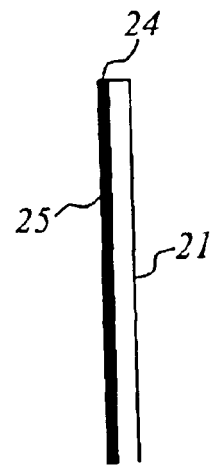
*FIG. 7*        *FIG. 8*

RADIATION SENSOR DEVICE

TECHNICAL FIELD

The present invention relates to radiation imaging systems and more specifically to a radiation sensor device used for detection of radiation.

BACKGROUND

Radiation sensor devices are used to detect radiation and provide spatial mapping of radiation intensity in radiation-based imaging systems. Such systems involve detection of incoming radiation, such as X-rays, gamma photons and charged particles, in a wide range of different applications including medical applications. Basically, a radiation source generates a beam in the direction of an object to be examined and a detector measures the intensity of the beam after it has passed through the object. The sensor device detects and measures the information required to produce an image representing the attenuation of the radiation resulting from absorption and scattering by the structure through which the beam traveled.

The sensor device is generally located within the detector unit and comprises a number of radiation sensitive elements (also referred to as pixels or sensor cells) arranged e.g. in a checked pattern in order to provide an appropriate spatial mapping. Such radiation sensitive elements may for instance be adapted for collecting charge or for sensing photons.

Many radiation systems involve radiation sources, such as X-ray tubes or radiation treatment machines, associated with a very high photon flow during the output pulse. This makes it extremely difficult to achieve sufficient resolution and integrating electronic readout is generally required. Integrating readout means that the deposited (integrated) charge on each pixel is collected and monitored at predetermined points of time, preferably when there is no radiation.

One way of accomplishing integrating readout is offered by well-known devices referred to as Charge Coupled Devices (CCDs). A CCD typically comprises a semiconductor surface whereupon islands (pixels), which can hold charge, are provided. The charge of an island can be moved to neighboring islands by changing control voltages surrounding the pixels. During readout the charges are commonly shifted repeatedly in rows towards a charge amplifier, which is located at the edge of the semiconductor structure. The resulting signal is in time consisting of the value of the content of individual pixels. A major problem associated with CCDs and similar devices is the fact that they are very radiation sensitive and the semiconductor surface easily get damaged by X-rays or MeV photons. Such devices are hence not a practically feasible alternative for systems with high charge flow rates.

To avoid radiation damage, newer materials like amorphous silicon and amorphous selenium have been developed. These materials are very radiation resistant and there do exist readout plates of amorphous silicon and selenium in the prior art. It is then generally desirable to have one transistor at each pixel as well as amplifiers arranged for instance at the end of each pixel row, whereby read-out can be realized by reading one row at the time. However, radiation-resistant transistors are extremely difficult to achieve, making the solution with plates of amorphous silicon and selenium rather problematic. Moreover, such plates are very expensive and provide a comparatively slow readout. Previous attempts to accomplish a sufficiently large surface area by means of this technology have not succeeded.

Another way of obtaining integrating readout would be to couple a charge amplifier and/or a multiplexer to every pixel avoiding the very sensitive process of moving charges in a controlled manner on a special surface. Due to complicated electronic structure, implementation of such a solution is generally not practically feasible when the number of pixels grows.

A number of sensor devices, developed for the purpose of providing a continues radiation sensor structure with a large number of pixels, have been proposed in the prior art. One approach is based on joining smaller detectors into large area mosaics. In the European patent EP 0 421 869, for example, a large sensor matrix for capturing images is formed by arranging a number of separate horizontal matrixes partly overlapping in a ladder-like structure. Besides being inflexible and bulky when a large number of sensitive elements, and thus a large number of horizontal matrixes, are needed, the proposed solution excludes realizations with planar or smooth sensor matrix surfaces. U.S. Pat. No. 6,323,475 discloses an alternative to such an approach. It describes a semiconductor imaging device including a detector substrate with a plurality of readout substrates connected thereto, where conductive tracks lead from selected detector positions to offset readout circuit positions.

Attempts have also been made to simplify the electronic circuitry in order to achieve readout for a large array of sensitive elements. U.S. Pat. No. 5,184,018 discloses a device with a common amplifier for each column of sensitive elements, instead of an amplifier for each sensitive element. This is achieved by a comparatively complicated design, where each sensitive element comprises an electric switch and switching lines and read lines are provided at rows and columns, respectively, of the matrix. From the above discussion, it follows that such a solution is comparatively radiation sensitive. Another example is the gamma ray semiconductor detector of U.S. Pat. No. 5,245,191, which aims at providing readout for a larger array of sensitive elements by coupling electrode pads of a semiconductor slab to a particular multiplexer type.

None of the above-cited documents discloses a radiation resistant sensor device presenting a large pixel area. The existing radiation sensor devices are associated with severe drawbacks and limitations and there is a considerable need for an improved radiation sensor device offering efficient readout and improved imaging even at high charge-flow rates.

SUMMARY

A general object of the present invention is to provide an improved radiation sensor device. A specific object of the invention is to provide a well-functioning radiation sensor device comprising a large number of individually connected radiation sensitive elements. Another object is to provide a radiation sensor device with improved image resolution. A further object of the invention is to provide a sensor device, which is simple and comparatively inexpensive to manufacture.

These objects are achieved in accordance with the attached claims.

Briefly, the invention offers a radiation sensor device with a new physical structure, which results in a number of advantages. A sensor device of the type comprising an array of radiation sensitive elements forming a sensor surface responsive to incident radiation is provided. The basic idea of the invention is to use the edge portion of a circuit board as an area for radiation sensing, whereas the larger main surface mainly is used for the space-demanding wiring and electronics. A complete sensor device can hence be defined by a number of such circuit boards, each with a row of radiation sensitive elements provided at an edge portion. The radiation sensitive elements are each connected to signal processing means, located outside the radiation field, by respective connection lines. The connection lines are arranged onto the main surface of the circuit board. The lines are advantageously wire connections drawn to provide an easy route to the associated signal processing means without wire-crossings. The circuit boards are preferably arranged adjacent to each other in such way that their main planes are substantially perpendicular to the sensor surface but oblique arrangements or the like are also possible.

The straightforward structure of the invention can easily be used to provide surfaces with a very large number of individually connected radiation sensitive elements. More elements in the row simply implies a somewhat deeper circuit board. Consequently, the sensor solution of the invention results in improved image precision and resolution. Furthermore, the invention enables integrating electronic readout without moving charge between the radiation sensitive elements and is therefore highly suited for applications with high charge flows.

In a preferred embodiment of the invention the signal processing means includes amplifiers and multiplexers in ASICs (Application Specific Integrated Circuits). There may with advantage be one dedicated amplifier for each radiation sensitive element. The ASIC of one circuit board is preferably located at an opposite end, or alternatively at a different height, as compared to ASICs of adjacent boards. Thereby, a most efficient space utilization is achieved provided that the ASIC protrusion does not exceed the board width. As for the radiation sensitive elements, they may be charge collectors, for instance implemented as islands of thin copper film on the edge surface of a non-conducting board. Other favorable embodiments discloses U-shaped pixels corresponding to the edge portion of the circuit board, flat sensor cells on the main surface of a comparatively thin board extending to the edge surface, and radiation sensitive elements formed by the end surfaces of the connection lines, respectively. The radiation sensitive elements could also be photodiodes or the like. The sensor surface of a radiation sensor device according to the invention may be either planar or curved.

A radiation sensor device according to the invention offers the following advantages:

Possibility of having a large number of radiation sensitive elements

Improved image resolution and contrast

Integrating electronic readout without charge transfer between pixels

Avoiding irradiation of semi-conductor devices

Straight-forward design

Inexpensive manufacturing of the device

Few expected errors

Other aspects of the present invention are related to a radiation detector, a radiation-based imaging system and a medical imaging system.

BRIEF DESCRIPTION OF THE DRAWINGS

The invention, together with further objects and advantages thereof, may best be understood by making reference to the following description taken together with the accompanying drawings, in which:

FIG. 5 is a cross-sectional view of the upper portion of a circuit board used in an embodiment of the invention;

FIGS. 6–8 show views corresponding to FIG. 5 for other embodiments of the invention;

DETAILED DESCRIPTION

Throughout the following description similar or corresponding elements bear the same reference numbers. The term "radiation" comprises electromagnetic radiation, such as visible light, as well as particle radiation including radiation of charged particles, e.g. electrons, and uncharged particles, e.g. neutrons.

Many radiation systems of today require read-out units with a comparatively large number of radiation sensitive elements. Integrating electronic readout may often be the only practically feasible alternative, in particular at high charge-flow rates. As mentioned, it would hereby be desirable to couple certain read-out electronics, such as a charge amplifier and/or a multiplexer, to each pixel. Then severe prior-art problems would be avoided, since charges would not have to be moved in a controlled manner on a special surface, nor would radiation sensitive elements, like transistors, have to be arranged at the pixels. However, such an implementation implies one amplifier and/or multiplexer input for every pixel. With modern ASIC technology this is feasible but high performance ASIC CMOS devices are comparatively sensitive to radiation and therefore have to be located outside the radiation beam area.

Figure 1:
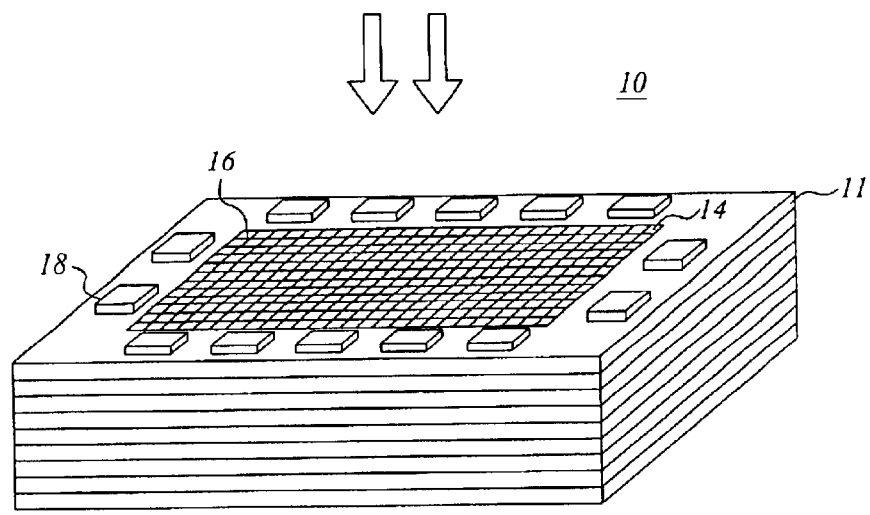
FIG. 1 illustrates a radiation sensor device according to prior art.

FIG. 1 illustrates an exemplary radiation sensor device with ASICs according to the prior art. The radiation sensor device 10 comprises a number of circuit board layers 11, the main planes of which are arranged substantially perpendicular to the incident radiation (indicated by arrows). A large number of charge-sensitive pixels 14 are arranged onto the uppermost layer, forming an array 16 of pixels facing the incident radiation. A number of ASICs 18, containing signal processing electronics, are provided in the outer region of the board, outside the radiation field.

The problem of the described structure mainly concerns coupling of the individual pixels to signal processing electronics, e.g. provided in ASICs. According to the conventional solution shown in FIG. 1, connection lines (not shown) between the pixels 14 and the ASICs 18 are drawn through the multilayer structure in a relatively complicated pattern. More pixels implies more layers or circuit boards and a more complicated line arrangement, especially when each pixel is individually connected to the signal processing means. Using multilayer circuit board technology with CAD assistance, an application with need of reading charge from 200 000 pixels would for instance result in a 36-layer solution. Such a device is not possible to manufacture at a reasonable cost and the expected errors are far too many. Hence, conventional technology is not applicable when a large number of pixels are needed.

Figure 2:
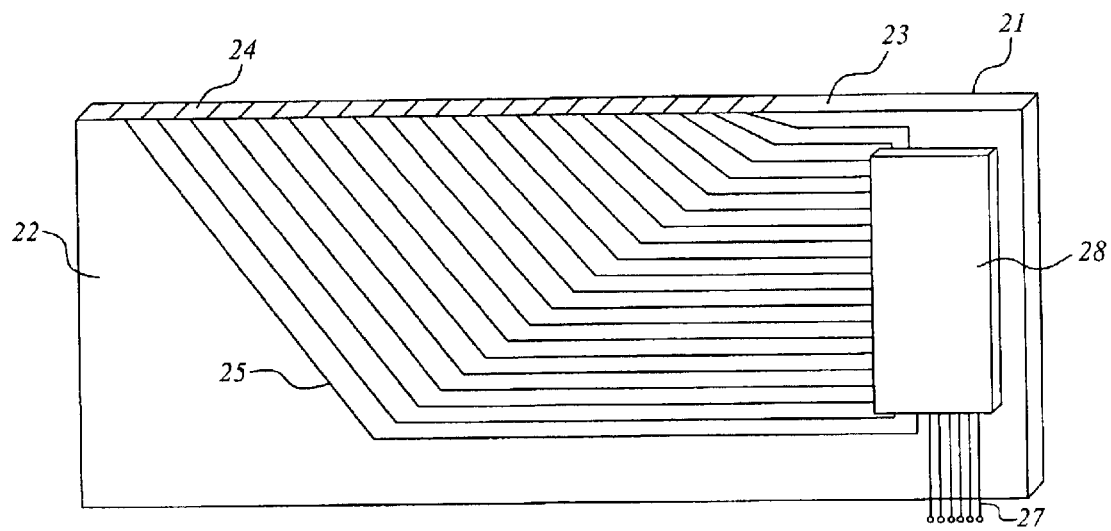
FIG. 2 illustrates a circuit board to be used in an embodiment of the invention.

The present invention solves the above-described wiring problem by providing an improved physical arrangement of the components in the charge sensing device. The new device is composed of a number of circuit boards composed in accordance with the principle of the invention. A preferred embodiment of such a circuit board is illustrated in FIG. 2. A circuit board 21 defined by two main surfaces 22 and four edge surfaces 23 is shown. A row of radiation sensitive elements 24 is arranged at one of the edge surfaces. Typically, connection lines 25 lead from each radiation sensitive element to signal processing means 28, such as an ASIC. In the illustrated embodiment, the signal processing means 28 is located at the same board as the addressed radiation sensitive elements. Read-out connections 27 are provided at the signal processing means 28 to connect the radiation sensor device of the invention to external processing electronics.

The basic idea of the invention is to use a small surface at the edge portion of a circuit board as an area for radiation sensing, whereas the larger main surface is used for the space-demanding wiring and electronics. In the preferred embodiment of FIG. 2, the signal processing means 28 is located at a distance from the row of radiation sensitive elements 24 to avoid radiation damages on the sensitive electronics. The illustrated connection lines 25 basically consist of a first portion extending from the radiation sensitive element 24 in a direction at an angle to the sensor surface and a second portion extending to the signal processing means 28 in a direction substantially parallel to the sensor surface. In other words, for vertical downward radiation, the first line portion extends in depth and the second portion is substantially horizontal. Naturally, other embodiments may reversely have a first line portion perpendicular to the sensor surface and a second line portion at an angle, or the like. Preferably, no lines are crossing. The structure of a circuit board according to the invention provides a comparatively straightforward and elegant solution to the wiring problem by using the depth of the board. More elements in the row simply implies a somewhat deeper circuit board, and rows with a large number of sensitive elements are hence easily implemented.

Figure 3:
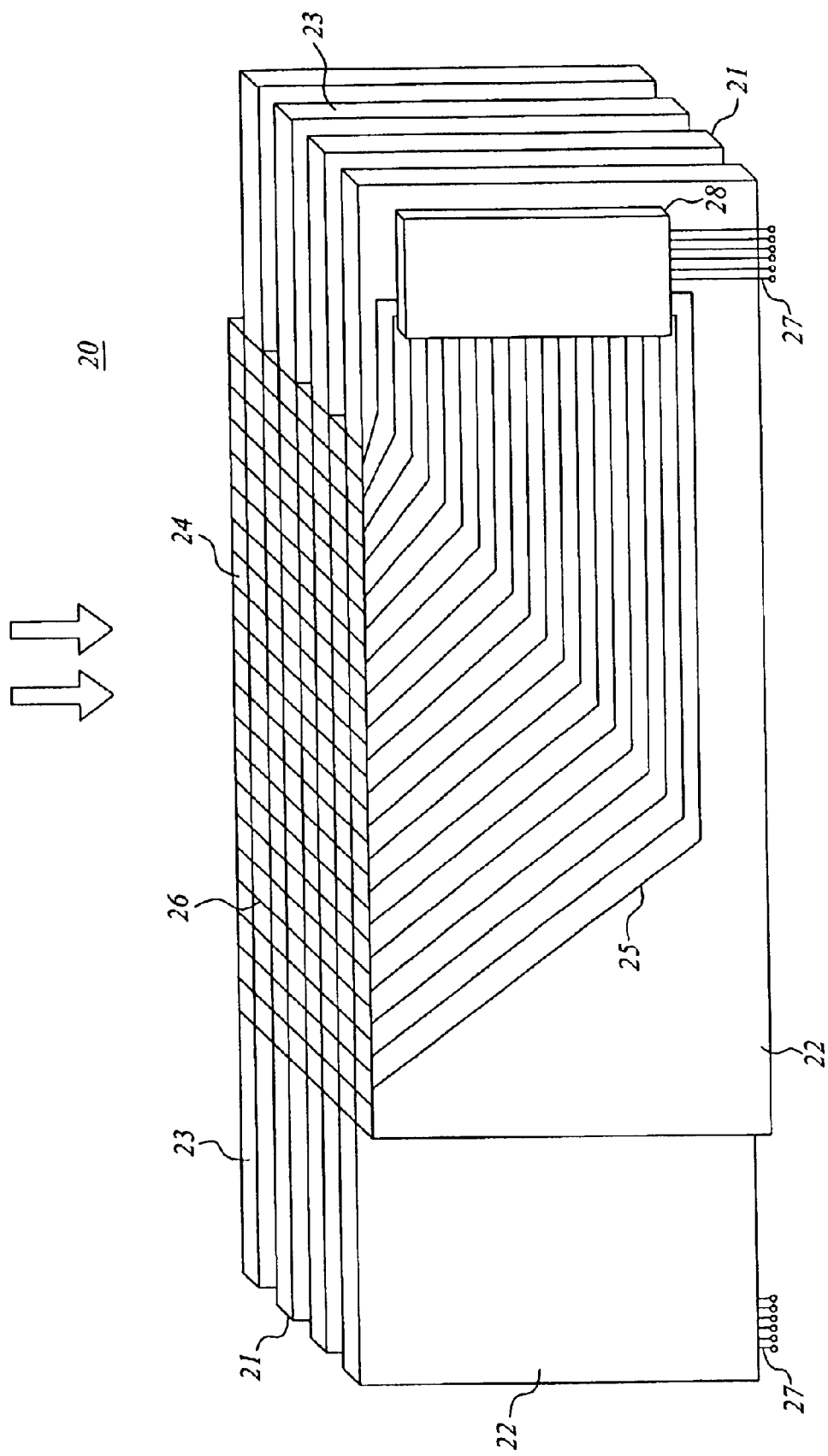
FIG. 3 illustrates a preferred embodiment of a radiation sensor device according to the invention.

FIG. 3 illustrates a preferred embodiment of a radiation sensor device according to the invention. The radiation sensor device 20 is composed of a number of circuit boards 21 arranged adjacent to each other. Preferably, the boards are placed in a support structure, whereby a favorable arrangement which facilitates removal/insertion of individual boards is accomplished, but the boards could also be adhesively attached to each other or still differently arranged. A sensor surface 26 is formed by the rows of radiation sensitive elements. In cases where all individual circuit boards have the same number of radiation sensitive elements 24, the sensor surface 26 will consist of N×M radiation sensitive elements, where N is the number of elements on each board edge and M is the number of circuit boards.

Preferably, the circuit boards 21 are arranged such that the main surfaces 22 are substantially perpendicular to the sensor surface 26, as illustrated by FIG. 3. There may also be embodiments with circuit boards that are oblique with respect to the sensor surface. In such cases the uppermost board portion may be cut off in an appropriate way to obtain a planar sensor surface.

FIG. 3 clearly illustrates the advantageous structure offered by a sensor device according to the invention. Although the disclosed sensor device has a sensor surface 26 merely composed of 168 radiation sensitive elements 24, it is readily understood that the illustrated principle easily can be used to provide surfaces with many more individually connected radiation sensitive elements. Several hundred thousand pixels on a surface of about 20 $dm^2$ may for example be achieved with the illustrated sensor structure. The invention thus enables radiation sensor devices with a large number of sensitive elements 24. The straightforward sensor solution of the invention results in improved image precision and resolution. In medical applications this could e.g. lead to more reliable and informative x-ray images, constituting means for better and more reliable treatment of patients.

A further advantage of the invention is that the sensor device is comparatively easy to manufacture since planning and implementation of complicated line schemes are avoided. This results in a comparatively low rejection percentage during manufacturing as well as very cost-beneficial radiation sensor means. Yet another advantage is that the number of expected errors in the signal transfer is considerably reduced. Should an error occur, the line arrangement of the invention facilitates quick identification and elimination thereof.

The sensor surface 26 consists in a preferred embodiment of 200 000 pixels arranged in a checked pattern and the size of the whole pixel structure is 40 cm by 40 cm. FIG. 3 shows a horizontally oriented sensor surface 26 adapted for reception of downward vertical radiation (indicated by arrows). Other embodiments of the invention may have vertically oriented sensor surfaces for sideward incident radiation or still differently oriented surfaces.

Some features of a radiation sensor device according to the present invention will now be described more in detail with reference to FIGS. 2 and 3.

Depending on the nature of incident radiation, the radiation sensitive elements 24 may be charge collectors for detection of electrons, radiation sensitive diodes, e.g. photodiodes, or any other elements capable of sensing the radiation reaching the sensor surface. Preferably, electrons are sensed by pixels made of a thin film of a conducting material, such as copper. The copper islands can reside charge of the surrounding radiation which may be collected via the signal processing means 28 at predefined points of time. Radiation sensitive diodes or the like, may advantageously be surface mounted at the board edge.

As for the main body of the circuit board 21, it is preferably composed of a non-conducting material, such as a polymer material. The illustrated board has a rectangular shape, but of course rounded or otherwise different shapes are also possible. Furthermore, it should be noted that the boards of FIGS. 2 and 3 for illustrative purposes have somewhat exaggerated relative proportions. A typical circuit board of the described type would for example be thinner, i.e. have smaller edge surfaces, than the illustrated board.

There may further be embodiments of the invention where some or all circuit boards are multilayer cards, with connection lines provided inside the card. A preferred number of layers in such a card would be in the range of 2–5 layers, whereby a relatively simple board structure is maintained.

The connection lines 25 between the individual radiation sensitive elements 24 and signal processing means 28 are preferably realized as metal wires. The lines are conveniently arranged in such way that an easy path to the associated signal processing means is achieved without involving unnecessary crossings. Moreover, it is naturally desirable to implement a line pattern that uses the main surface of the board as efficiently as possible.

As previously mentioned, the radiation sensitive electronics of the signal processing means has to be located outside the sensor surface to be protected from the incident radiation. The signal processing means 28 generally protrudes above the main surface of the circuit board 21 and in a preferred embodiment efficient space utilization is accomplished by placing the signal processing means at an end portion of the respective circuit board. Preferably, all circuit boards are identical to facilitate manufacturing thereof. By arranging the circuit boards such that adjacent boards have their signal processing means at opposite ends, as illustrated in FIG. 3, and restricting the maximum allowed protrusion of the signal processing means to one circuit board thickness, a compact sensor device can be formed. Actually, such a solution allows directly adjacent circuit boards, which results in efficient usage of space and a favorable close-fitted array of radiation sensitive elements.

Another embodiment of the invention achieves a similar advantageous space utilization by arranging the signal processing means of adjacent boards at different heights, instead of at different board ends. The protruding signal processing means is thereby positioned in a non-overlapping way. An additional advantage of such an embodiment is that all connections between the signal processing means and external electronics may be arranged at the same end of the radiation sensor device. Various other arrangements, including circuit boards with two or more units for signal processing means at various locations on one or both main surfaces, are also covered by the invention.

The signal processing means may include amplifiers and/or multiplexers as well as other electrical components, such as A/D-converters and microprocessors. In a preferred embodiment, there is one dedicated amplifier for each radiation sensitive element. Such a case may be realized by means of ASIC technology or equivalent circuit technology. For example, the amplifiers can be connected as current integrators and manufactured, with possible associated multiplexers, as an integrated circuit using conventional silicon crystal technique. The radiation sensitive element is then preferably connected in series with the amplifier succeeded by the multiplexer. The signal processing means of the radiation sensor device may also comprise imaging processing means, which generally is located outside the circuit but which could be at least partly included in ASIC structures.

Figure 4:
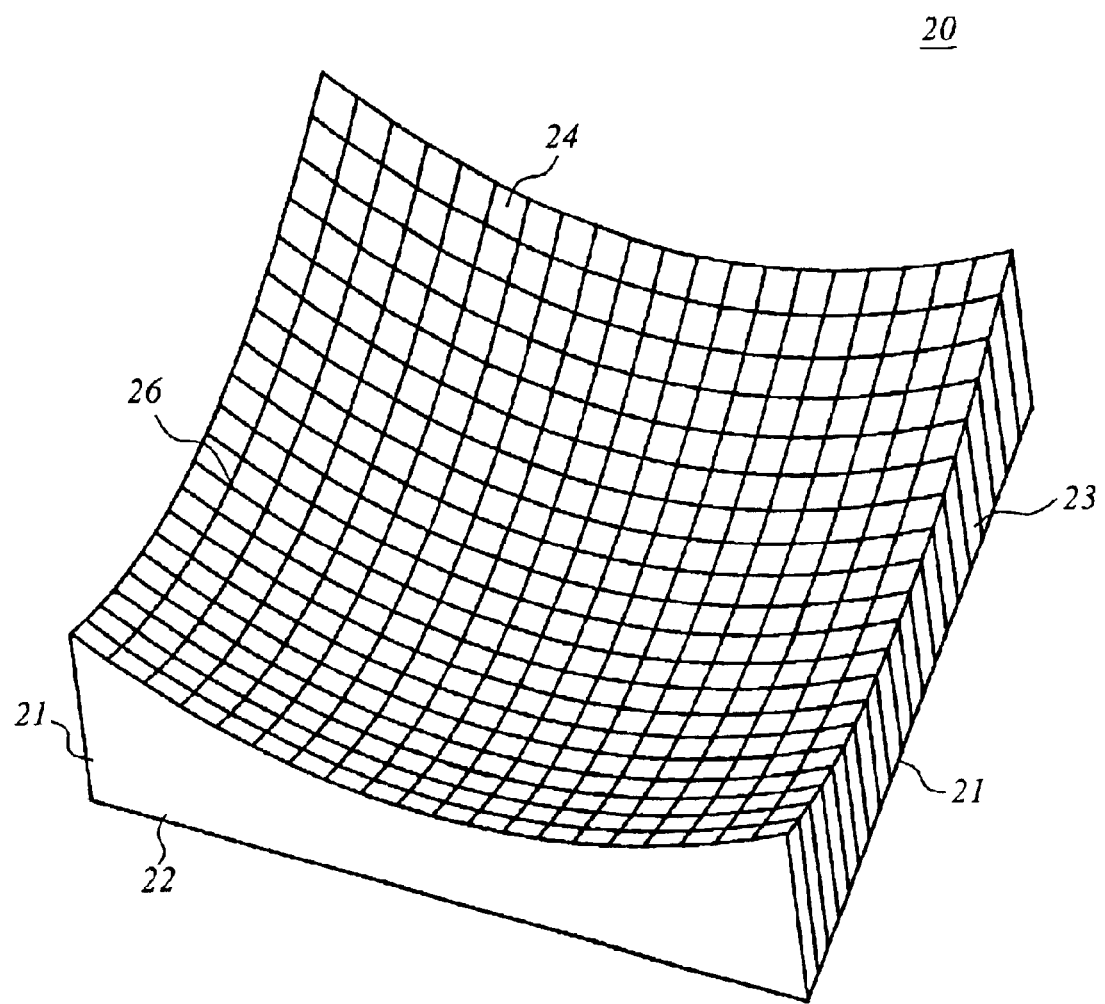
FIG. 4 illustrates another embodiment of a radiation sensor device according to the invention.

FIG. 4 illustrates another embodiment of a radiation sensor device according to the invention. The structure of this embodiment differs from the device of FIG. 3 in that the sensor surface 26 formed by the array of radiation sensitive elements is curved instead of planar. The curved sensor surface is favorable when a point-like radiation source at a distance from the sensor device is used, since the surface may be adapted to achieve equal distances between the source and respective sensitive element. Thereby, further signal and image processing is simplified.

FIG. 5 is a cross-sectional view of the upper portion of a circuit board used in an embodiment of the present invention. The circuit board 21 is edge-plated with a copper film 29, corresponding to the shape of the edge portion of the circuit board. This results in a generally (inverted) U-shaped metal film, the top of which constitutes the actual radiation receiving sensitive element 24.

FIGS. 6–8 show views corresponding to FIG. 5 for other embodiments of the invention. The radiation sensitive elements 24 in the embodiment illustrated by FIG. 6 are metal-film pixels 29, which have a rectangular shape and are arranged on the edge surface of the board 21. In the embodiment of FIG. 7, the metal film 29 only covers the uppermost portion of the main surface of the circuit board 21. The metal film extends to the edge surface and results in a comparatively small pixel area 24. In FIG. 8, the end surface of respective connection line 25 constitutes a radiation sensitive element 24. As in FIG. 7, the edge surface of the circuit board and the active surface of the radiation sensitive element are in operation both facing the incident radiation. A circuit board in accordance with the principle illustrated by FIG. 8 is easy to manufacture.

The embodiments in FIGS. 7 and 8 result in a sensor surface where portions of the edge surface are exposed between the radiation sensitive elements. When the pixel area is situated in an electric field, this is normally not a problem since the field will be focused towards the conducting pixels which are on an electric potential usually called virtual ground (amplifier feedback input). A necessary requirement is that other potentials on the structure are located physically far below from the surface, though. In some cases using radiation sensitive elements like those in FIGS. 7 and 8, it may be appropriate to employ comparatively thin circuit boards.

Although most examples in this disclosure concern rectangular radiation sensitive elements or radiation sensitive elements with rectangular radiation receiving surfaces, the skilled man understands that square, round or still differently shaped radiation sensitive elements may also be employed. Such variants of course lie within the scope of the invention.

Figure 9:
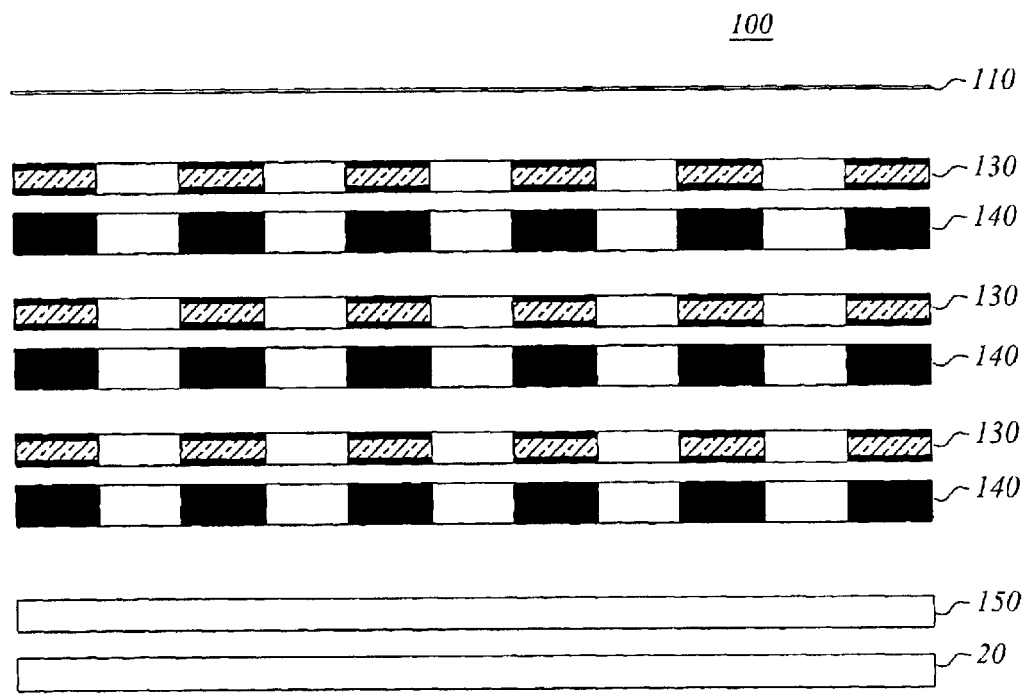
FIG. 9 illustrates a radiation detector according to an embodiment of the present invention.

FIG. 9 illustrates a radiation detector according to an embodiment of the present invention. The illustrated detector is based on a type intended for imaging with both X-ray and gamma photons, such as the detector proposed by Brahme et al. in the International Patent Application WO 01/59478 published on Aug. 16, 2001. The overall detector 100 comprises a stack of well aligned, alternating perforated gas electron multiplier layers (GEMs) 130 and gamma converter layers 140, as schematically illustrated in FIG. 9. The top layer in the alternating stack is preferably a GEM 130 for multiplication of electrons generated in the top gas volume. In the gas volume between the inlet window 110 and the top GEM, diagnostic X-rays will interact with the gas and emit electrons, which are focused and amplified by the GEM structures 130 in the stack. For photons in the radiation therapy beam, the top gas volume will be more or less transparent, and such higher energy photons penetrates into the stack and converts into electrons in the different converter layers 140. High-energy photons of relatively low energy will predominantly convert in the top converter layers, while photons of relatively high energy will dominate in the bottom layers.

At the bottom of the stack, a radiation sensor device 20 is arranged for collection of the electrons and/or photons resulting from the alternating converter and multiplier stack. The sensor device 20 is based on the structural principle of FIG. 3. It is beneficial to use a suitable multiplication structure 150, preferably arranged just above the sensor device 20, for avalanche multiplication of electrons and/or photo multiplication of photons to be detected by the sensor device. Thereby, the effect of induced charge on the spatial resolution will be negligible.

Figure 10:
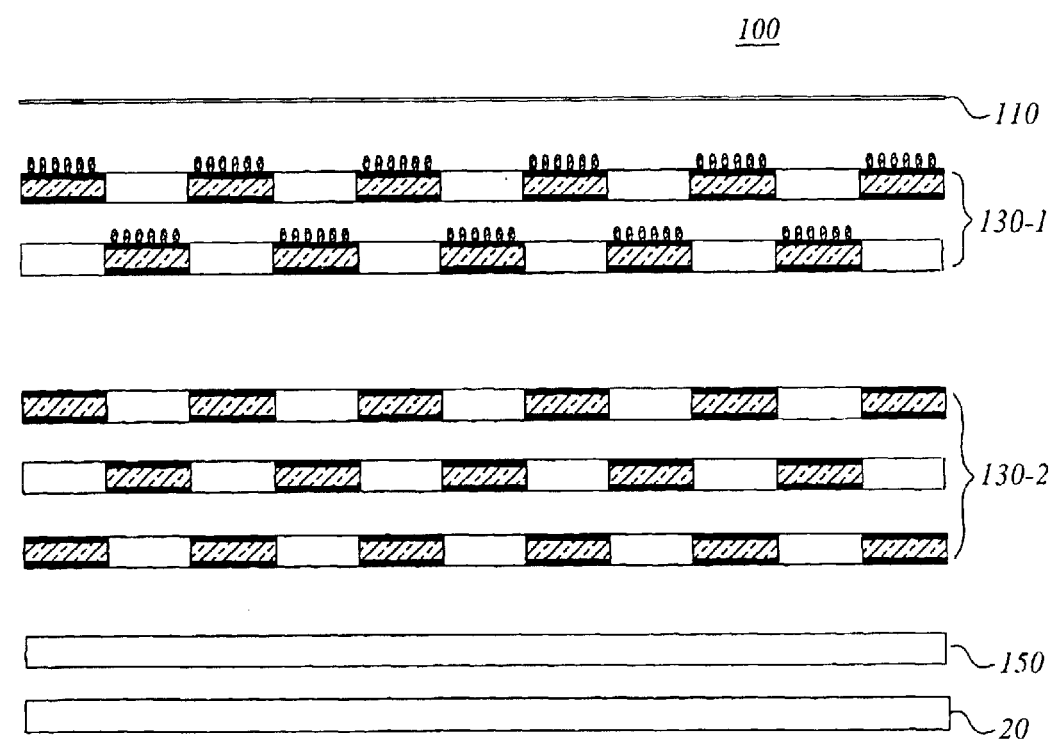
FIG. 10 illustrates a radiation detector according to another embodiment of the present invention.

The radiation detector illustrated by FIG. 9 has well-aligned layer perforations. According to a new advantageous detector structure with multiple converter layers, illustrated by FIG. 10, the detector layers are instead slightly shifted in such way that drift holes of one converter layer are staggered with respect to drift holes of another converter layer. The sensor device of the invention may of course be used in a radiation detector with staggered layer drift holes as well. Such a detector structure as well as various other detector types thus lie within the scope of the present invention. The detector in FIG. 10 has two stacks 130-1, 130-2 of mutually staggered converter layers. Preferably, the layers of the first stack 130-1 are adapted for photons of lower energy, while the layers of the second stack 130-2 are adapted for photons of higher energy.

The converter layer (or layers) may be provided with diamond (uniformly or non-uniformly) for improving the conversion efficiency of incoming radiation (especially applicable to X-rays) into electrons. Preferably, CVD (Chemical Vapor Deposition) techniques are used for causing diamond deposition, for example vaporized from methane ($CH_4$) gas. CVD is generally a gas-phase chemical reaction occurring above a solid surface, causing deposition onto the surface. CVD techniques for producing diamond normally require some means of activating gas-phase carbon-containing precursor molecules, for example by maintaining the substrate within a given temperature interval and ensuring that the precursor gas is diluted in an excess of hydrogen.

In the converter layers, CVD diamond may be used as insulating material, for example sandwiched between two electrode layers. For manufacturing, the CVD diamond may be deposited onto a first metal electrode layer, with a vacuum evaporated second metal layer on top of the CVD diamond. Alternatively, it is possible to provide the CVD diamond as a diamond film or coating on one or both of the electrodes and/or on the walls defining the capillary holes. The use of CVD diamond is expected to give a very high yield (~20) of secondary electrons, thus resulting in a very efficient converter structure.

Figure 11:
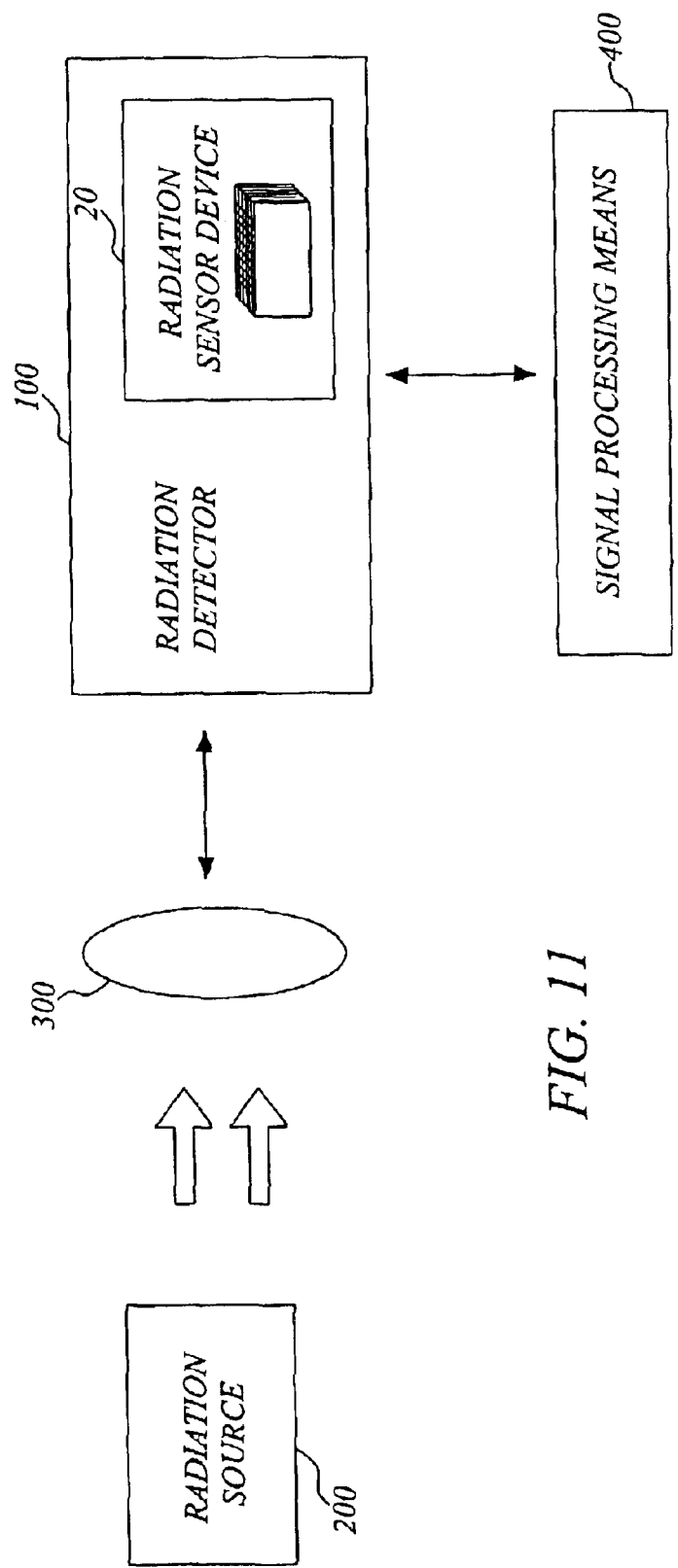
FIG. 11 is a schematic block diagram of a radiation-based imaging system according to an embodiment of the present invention.

FIG. 11 is a schematic block diagram of a radiation-based imaging system according to an embodiment of the present invention. A radiation source 200 sends radiation, such as electrons, X-ray radiation or gamma radiation, towards an object 300. A radiation detector 100 is arranged substantially at the opposite side of the object in relation to the radiation source. The detector comprises a radiation sensor device 20 based on the principle illustrated by FIG. 3. The detector generally includes means for converting and/or amplifying the radiation into a suitable form, which can be appropriately sensed by the radiation sensor device 20. A stack of multiplication and amplification layers (130 and 140 in FIG. 9) may constitute such means. The sensor device 20 provides spatial mapping of the intensity of the incident radiation. This information can then be used by internal or external signal processing means 400 to produce an image representing features of the internal structure of the object 300 through which the beam traveled. In addition to the previously described integrated circuits, the signal processing means of an imaging system typically involves image processors, data storage means, and the like.

Figure 12:
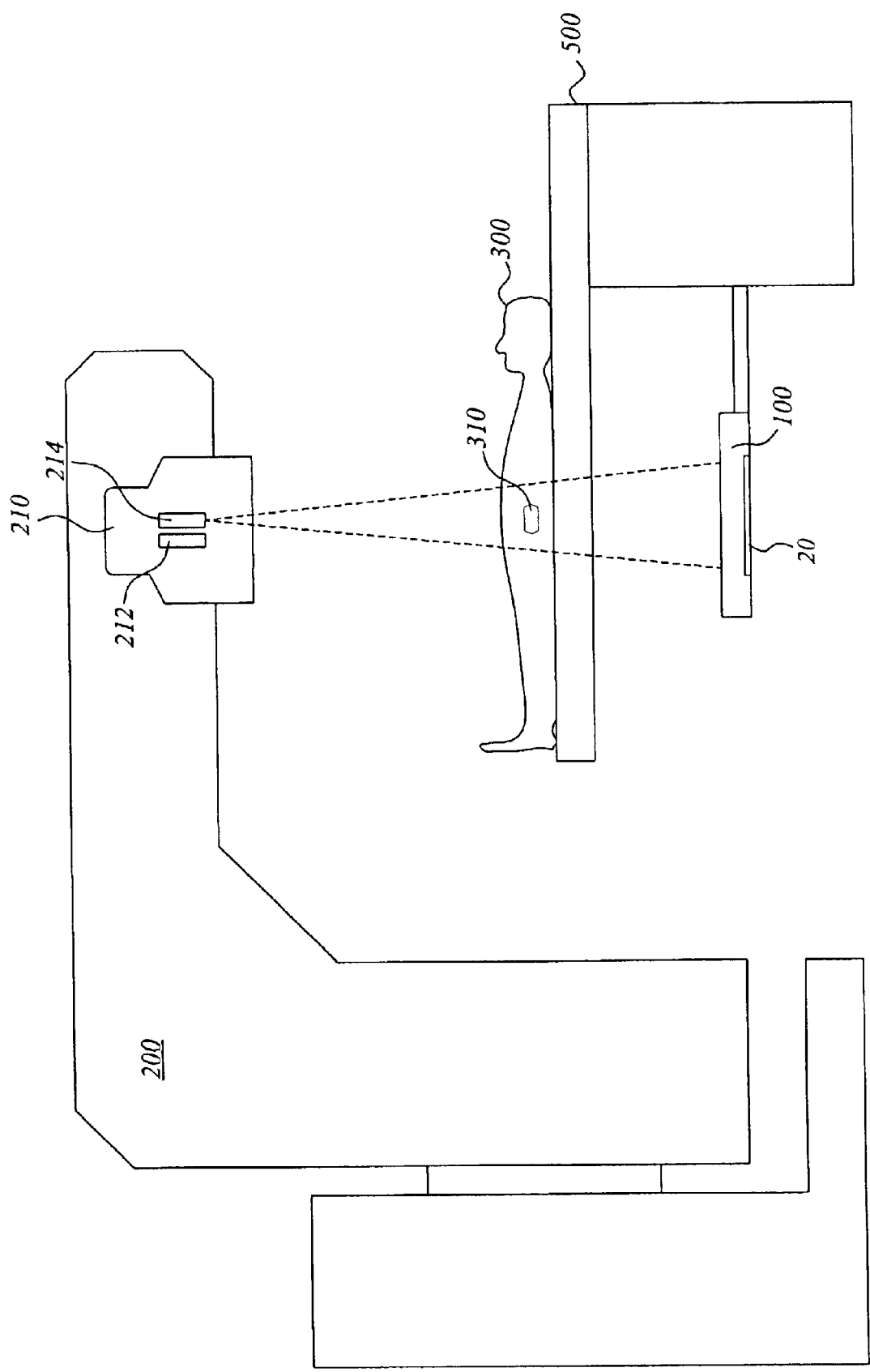
FIG. 12 illustrates a medical imaging system according to an embodiment of the present invention.

FIG. 12 illustrates a medical imaging system according to an embodiment of the present invention. A radiation therapy set-up, in which a radiation detector with a radiation sensor device according to the invention is used, is shown. In this particular embodiment, the therapeutic and diagnostic machine 200 has a radiation head 210 including both a radiation source 212 for therapeutic irradiation and a diagnostic radiation source such as an X-ray tube 214. Naturally, the diagnostic radiation source 212 may alternatively be arranged outside the radiation head 210. Alternative embodiments of the imaging system can have rotational radiation heads 210 or the like in order to avoid movement of a patient e.g. in cases of non-coplanar irradiation. The patient 300 is positioned on a couch 500, and a radiation detector 100 with a radiation sensor device 20 according to the invention is placed underneath the patient for detection of both therapeutic radiation for portal imaging and diagnostic radiation for ordinary diagnostic imaging.

For diagnostic purposes, the X-ray tube 214 sends X-rays (typically 10–150 keV) towards a specific area of interest in the patient 300. In radiotherapy, radiation, such as electrons or gamma radiation, of relatively high energy (typically 1–100 MeV) is collimated and sent from the radiation source 212 towards a target volume 310 in the patient 300. After passing the patient, the diagnostic and therapeutic radiation beam, respectively, reaches the detector 100, where it may be converted in converter layers adapted for lower and higher energy, respectively. The emitted electrons are then preferably drifted towards a multiplication structure before being detected by the radiation sensor device 20.

The output time structure of the treatment machine is usually in the form of bursts, a couple of microseconds with a delay of some milliseconds until the next pulse comes out. This results in very high photon flow during the pulse (about $10^{10}$ photons/$mm^2 \cdot s$). The charge read from the radiation sensitive elements is typically in the order of femto-coulombs up to tens of pico-coulombs.

Image processing means (not shown), such as a computer, connected to the detector 100 processes radiation signals detected by the sensor device 20 into images of relevant parts of the patient, e.g. a tumor and adjacent tissue and organs. The diagnostic X-ray images have comparatively high quality and contrast and may be used for initial alignment of the patient on the couch. The radiation dose is then well-focused towards the tumor, and the risk of exposing sensitive tissue and organs to the highly energetic therapy beams is minimized. The complementary portal images obtained during the actual radiation treatment can be used to correct patient set-up and facilitate on-line control and treatment verification.

Although the invention has been described herein with reference to specific illustrated embodiments thereof, it should be emphasized that the invention also covers equivalents to the disclosed features, as well as modifications and variants thereof that are obvious to the man skilled in the art. Therefore, the scope of the invention should only be limited by the enclosed claims.

What is claimed is:

1. A radiation sensor device responsive to incident radiation and comprising radiation sensitive elements forming a sensor surface, and connection lines for connecting said radiation sensitive elements to signal processing means outside the radiation field, wherein said radiation sensor device further comprises a number of circuit boards each defined by two main surfaces and at least one edge surface, the area of said edge surface being substantially smaller than the area of said main surfaces;

each of said circuit boards has a set of said radiation sensitive elements arranged at or in the vicinity of at least one edge surface and the connection lines from the radiation sensitive elements in said set are arranged on at least one of said main surfaces of said circuit board; and said circuit boards are arranged adjacent to each other such that said sets of radiation sensitive elements form said sensor surface.

2. The radiation sensor device according to claim 1, wherein said main surfaces are substantially perpendicular to said sensor surface.

3. The radiation sensor device according to claim 1, wherein each of said radiation sensitive elements is connected to said signal processing means by a respective one of said connection lines.

4. The radiation sensor device according to claim 1, wherein said signal processing means involves amplifying means.

5. The radiation sensor device according to claim 4, wherein said amplifying means comprises a dedicated amplifier for each of said radiation sensitive elements.

6. The radiation sensor device according to claim 1, wherein said signal processing means comprises at least one Application Specific Integrated Circuit (ASIC).

7. The radiation sensor device according to claim 6, wherein said at least one ASIC is associated with a respective one of said circuit boards and comprises a dedicated amplifier and a dedicated multiplexer for each radiation sensitive element of the circuit board, said amplifier and said radiation sensitive element being interconnected by a respective one of said connection lines, and said multiplexer being connected to said amplifier.

8. The radiation sensor device according to claim 1, wherein said signal processing means is at least partly arranged on said circuit board.

9. The radiation sensor device according to claim 8, wherein the signal processing means of each of said circuit boards is arranged at an opposite end of the circuit board compared to the signal processing means of an adjacent circuit board, and protrudes outside one of said main surfaces of said circuit board, the protrusion being less than the thickness of said circuit board.

10. The radiation sensor device according to claim 8, wherein the signal processing means of each of said circuit boards is arranged at a different height of the circuit board compared to the signal processing means of an adjacent circuit board, and protrudes outside one of said main surfaces of said circuit board, the protrusion being less than the thickness of said circuit board.

11. The radiation sensor device according to claim 1, wherein said radiation sensitive elements have a generally rectangular shape and are arranged on said at least one edge surface.

12. The radiation sensor device according to claim 1, wherein said radiation sensitive elements have a generally U-shaped cross-section corresponding to the shape of the edge portion of said circuit board.

13. The radiation sensor device according to claim 1, wherein at least one of said radiation sensitive elements is an end surface of the respective connection line.

14. The radiation sensor device according to claim 1, wherein said incident radiation is electrons.

15. The radiation sensor device according to claim 1, wherein said radiation sensitive elements are charge collectors.

16. The radiation sensor device according to claim 1, wherein said radiation sensitive elements each comprises a thin metal film.

17. The radiation sensor device according to claim 1, wherein said radiation sensitive elements are radiation sensitive diodes.

18. The radiation sensor device according to claim 1, wherein said radiation sensitive elements are photosensitive elements.

19. The radiation sensor device according to claim 1, wherein said sensor surface is a continuous and substantially planar surface.

20. The radiation sensor device according to claim 1, wherein said sensor surface is curved.

21. The radiation sensor device according to claim 1, wherein a set of radiation sensitive elements is arranged at or in the vicinity of the edge of each of said circuit boards and said circuit boards are arranged adjacent to each other with the main planes substantially perpendicular to said sensor surface.

22. A radiation sensor device responsive to incident radiation and comprising radiation sensitive elements forming a sensor surface, and connection lines for connecting said radiation sensitive elements to signal processing means outside the radiation field, wherein said radiation sensor device further comprises a number of circuit boards each defined by two main surfaces and at least one edge surface, the area of said edge surface being substantially smaller than the area of said main surfaces;

each of said circuit boards has a set of said radiation sensitive elements arranged such that, in operation, said edge surface and the active surface of each of said radiation sensitive elements are facing said incident radiation and the connection lines from the radiation sensitive elements in said set are arranged on at least one of the main surfaces of said circuit board; and the circuit boards are arranged adjacent to each other such that said sets of radiation sensitive elements form said sensor surface.

23. The radiation sensor device according to claim 22, wherein said main surfaces are substantially perpendicular to said sensor surface.

24. The radiation sensor device according to claim 22, wherein each of said radiation sensitive elements is connected to said signal processing means by a respective one of said connection lines.

25. The radiation sensor device according to claim 22, wherein said signal processing means involves amplifying means.

26. The radiation sensor device according to claim 25, wherein said amplifying means comprises a dedicated amplifier for each of said radiation sensitive elements.

27. The radiation sensor device according to claim 22, wherein said signal processing means comprises at least one Application Specific Integrated Circuit (ASIC).

28. The radiation sensor device according to claim 27, wherein said at least one ASIC is associated with a respective one of said circuit boards and comprises a dedicated amplifier and a dedicated multiplexer for each radiation sensitive element of the circuit board, said amplifier and said radiation sensitive element being interconnected by a respective one of said connection lines, and said multiplexer being connected to said amplifier.

29. The radiation sensor device according to claim 22, wherein said signal processing means is at least partly arranged on said circuit board.

30. The radiation sensor device according to claim 29, wherein the signal processing means of each of said circuit boards is arranged at an opposite end of the circuit board compared to the signal processing means of an adjacent circuit board, and protrudes outside one of said main surfaces of said circuit board, the protrusion being less than the thickness of said circuit board.

31. The radiation sensor device according to claim 22, wherein said radiation sensitive elements are flat elements, arranged on said main surfaces in the vicinity of the edge of said circuit boards, extending to said edge surfaces.

32. The radiation sensor device according to claim 22, wherein at least one of said radiation sensitive elements is an end surface of the respective connection line.

33. A radiation detector comprising a radiation sensor device having radiation sensitive elements forming a sensor surface, and connection lines for connecting each radiation sensitive element to signal processing means outside the radiation field surrounding the radiation sensitive elements, wherein
- said radiation sensor device further comprises a number of circuit boards each defined by two main surfaces and at least one edge surface, the area of said edge surface being substantially smaller than the area of said main surfaces;
- each of said circuit boards has a set of said radiation sensitive elements arranged at or in the vicinity of at least one edge surface and the connection lines from the radiation sensitive elements in said set are arranged on at least one of said main surfaces of said circuit board; and
- said circuit boards are arranged adjacent to each other such that said sets of radiation sensitive elements form said sensor surface.

34. The radiation detector according to claim 33, further comprising a radiation converter based on a stack of multiple converter layers, each converter layer being adapted for interaction with incident radiation to cause emission of electrons drifting into drift holes defined in the converter layer, drift holes of one of the converter layers being staggered with respect to drift holes of another one of the converter layers.

35. The radiation detector according to claim 33, wherein the radiation sensitive elements are charge collecting elements and the detector comprises a multiplication structure for avalanche multiplication of the electrons, the charge collecting elements being arranged to collect the electrons.

36. The radiation detector according to claim 33, wherein the radiation sensitive elements are photosensitive elements and the detector comprises a multiplication structure for photomultiplication, the photosensitive elements being arranged to collect the photons.

37. A radiation-based imaging system comprising a radiation source for object imaging and a radiation detector having a radiation sensor device with radiation sensitive elements forming a sensor surface, and connection lines for connecting said radiation sensitive elements to signal processing means outside the radiation field, wherein
- said radiation sensor device further comprises a number of circuit boards each defined by two main surfaces and at least one edge surface, the area of said edge surface being substantially smaller than the area of said main surfaces;
- each of said circuit boards has a set of said radiation sensitive elements arranged at or in the vicinity of at least one edge surface and the connection lines from the radiation sensitive elements in said set are arranged on at least one of said main surfaces of said circuit board; and
- said circuit boards are arranged adjacent to each other such that said sets of radiation sensitive elements form said sensor surface.

38. A medical imaging system comprising a radiation source for object imaging and a radiation detector having a radiation sensor device with radiation sensitive elements forming a sensor surface, and connection lines for connecting said radiation sensitive elements to signal processing means outside the radiation field, wherein
- said radiation sensor device further comprises a number of circuit boards each defined by two main surfaces and at least one edge surface, the area of said edge surface being substantially smaller than the area of said main surfaces;
- each of said circuit boards has a set of said radiation sensitive elements arranged at or in the vicinity of at least one edge surface and the connection lines from the radiation sensitive elements in said set are arranged on at least one of said main surfaces of said circuit board; and
- said circuit boards are arranged adjacent to each other such that said sets of radiation sensitive elements form said sensor surface.

* * * * *